(12) United States Patent
Fukuo

(10) Patent No.: US 6,672,554 B2
(45) Date of Patent: Jan. 6, 2004

(54) ARTICLE STORAGE DEVICE AND SHUTTER USED THEREIN

(75) Inventor: Michihiro Fukuo, Tokyo (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/241,500

(22) Filed: Sep. 12, 2002

(65) Prior Publication Data
US 2003/0052129 A1 Mar. 20, 2003

(30) Foreign Application Priority Data
Sep. 19, 2001 (JP) .......................... 2001-284388
Sep. 19, 2001 (JP) .......................... 2001-284463

(51) Int. Cl.[7] ............................................. A47K 1/08
(52) U.S. Cl. ................ 248/311.2; 224/926; 297/188.19
(58) Field of Search .............................. 248/311.2, 314; 224/926, 37.12, 483; 220/350, 345.4; 206/759; 297/188.14, 188.19

(56) References Cited

U.S. PATENT DOCUMENTS

| | | | | |
|---|---|---|---|---|
| 5,205,447 A | * | 4/1993 | Hambrick | 224/42.33 |
| 5,205,452 A | * | 4/1993 | Mankey | 224/275 |
| 6,550,736 B2 | * | 4/2003 | Schaal | 248/311.2 |
| 2002/0033353 A1 | * | 3/2002 | Kikuchi et al. | |
| 2003/0025058 A1 | * | 2/2003 | Dieringer et al. | |

FOREIGN PATENT DOCUMENTS

| | | | |
|---|---|---|---|
| JP | 54033442 | * | 3/1976 |
| JP | 62033335 | * | 2/1987 |
| JP | 62-163373 | * | 5/1989 |
| JP | 7082967 | * | 3/1995 |
| JP | 8192685 | * | 7/1996 |

* cited by examiner

Primary Examiner—Ramon O. Ramirez
(74) Attorney, Agent, or Firm—Kanesaka & Takeuchi

(57) ABSTRACT

An article storage device, which is installed in a vehicle, includes a storage section for storing an article and a shutter as a cover for opening and closing an opening of the storage section. The storage section is formed of side surfaces, a back surface and an inner bottom surface to define an inside thereof, and includes guide grooves formed along both protruded rim portions at both sides of the storage section. A shutter is bendable in a sliding direction and attached to the guide grooves. The shutter is formed of a main body bendable at a plurality of thin walled portions, and a plurality of projections provided at both sides of the main body to be fitted in the guide grooves. Each projection is disposed lower than the main body to have a step therebetween.

12 Claims, 14 Drawing Sheets

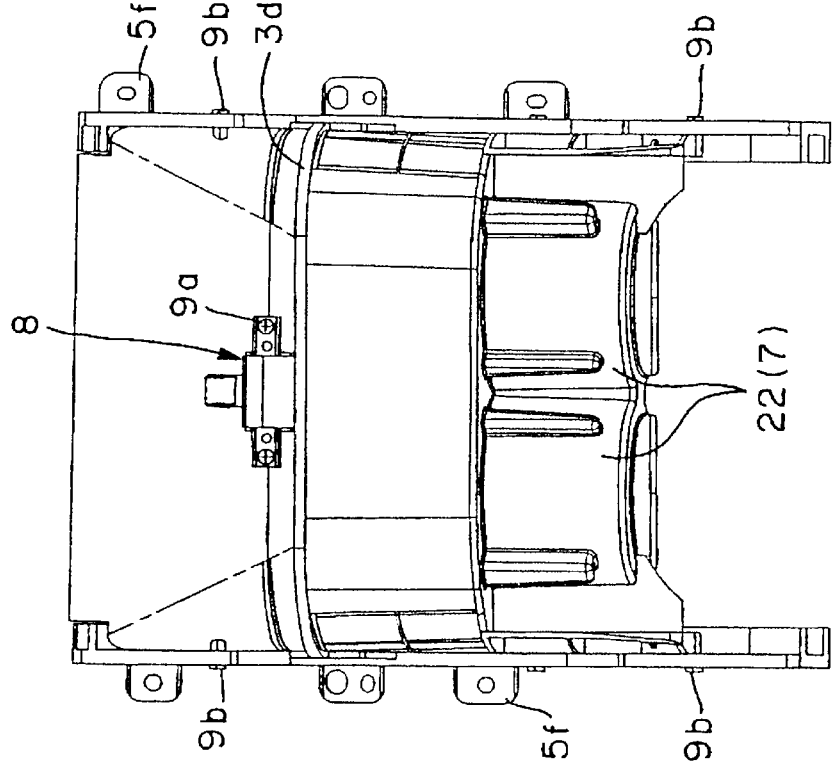
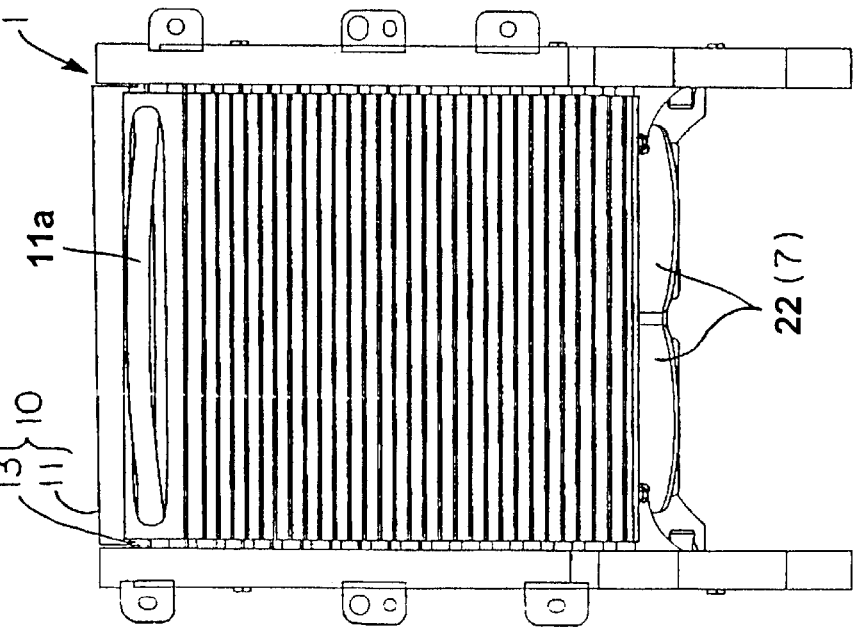

Fig. 4(a)
Fig. 4(b)
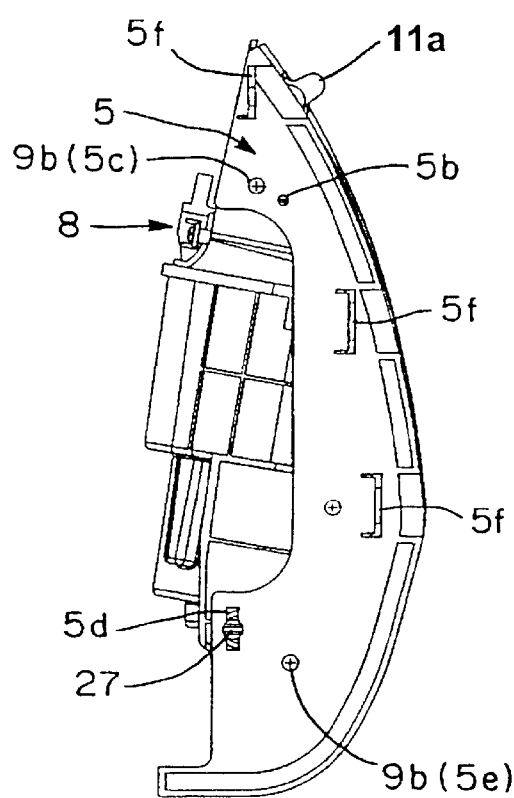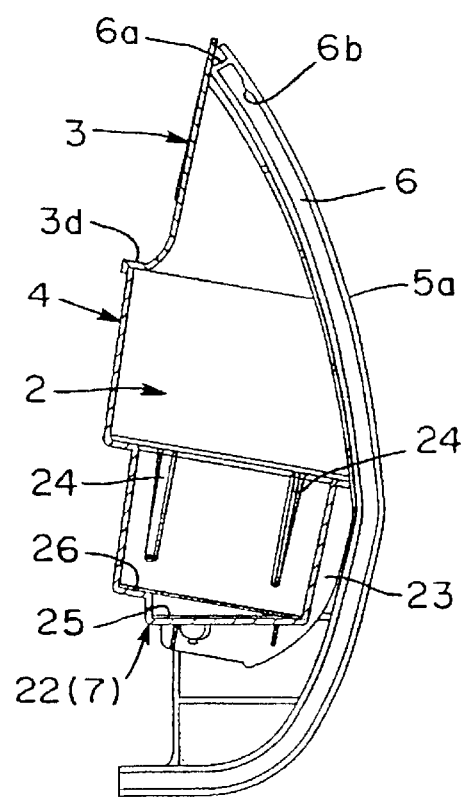

Fig. 7(a)
Fig. 7(b)
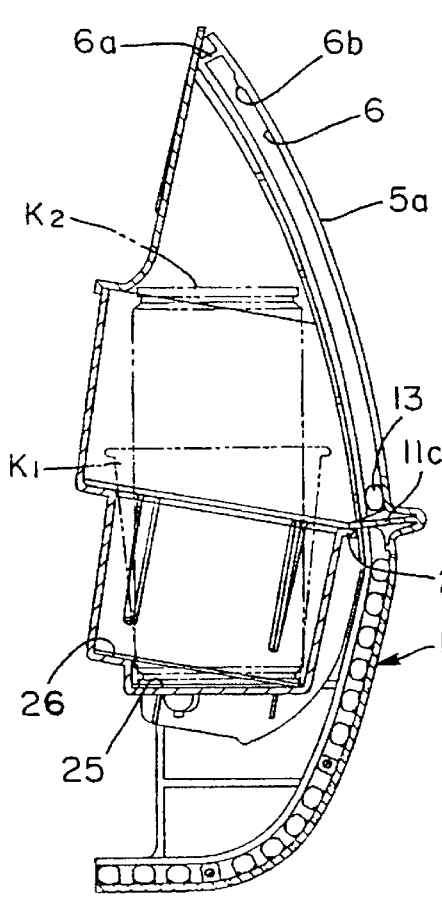
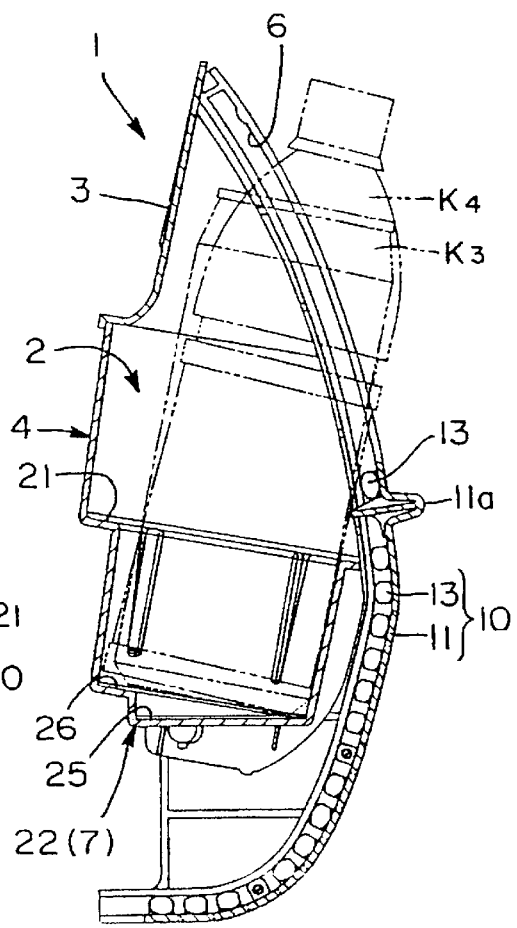

Fig. 8(a)
Fig. 8(b)
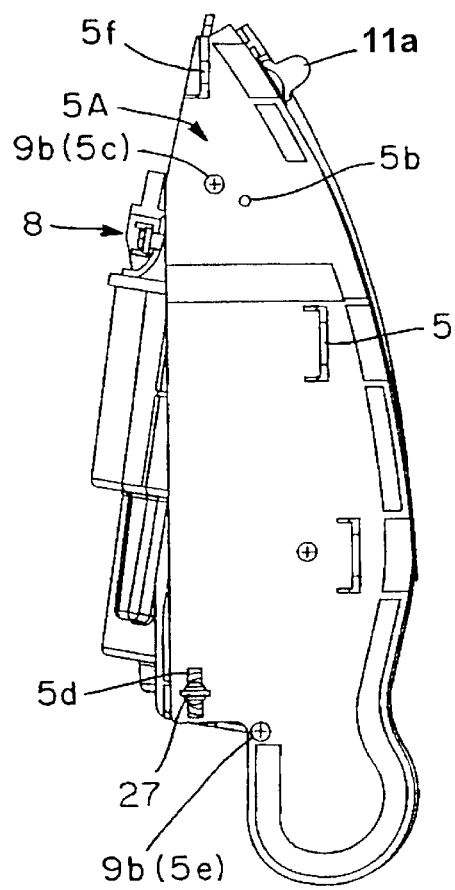
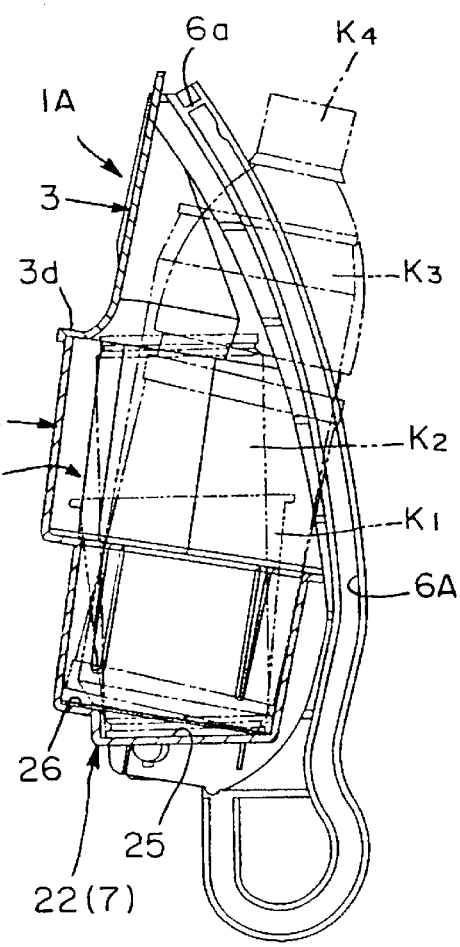

Fig. 14(a) Prior Art
Fig. 14(b) Prior Art
Fig. 14(c) Prior Art
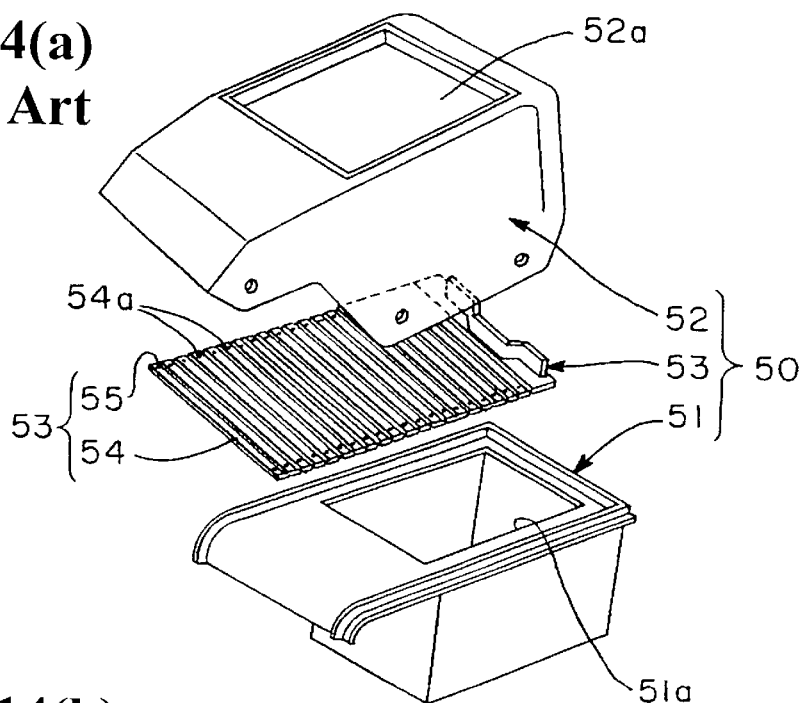
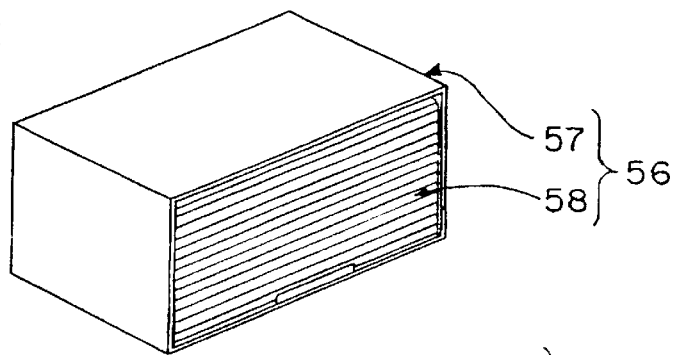
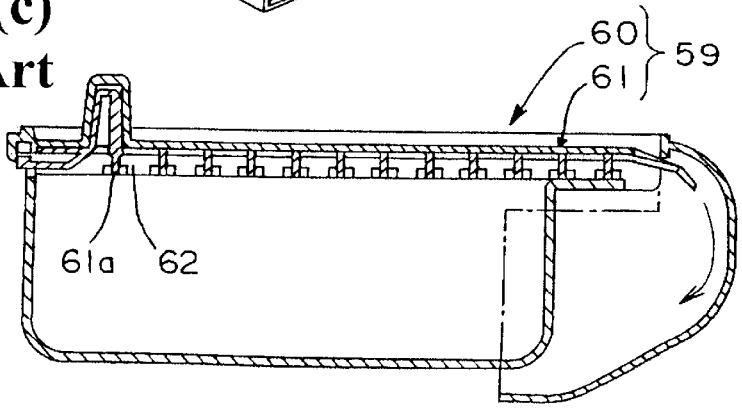

ARTICLE STORAGE DEVICE AND SHUTTER USED THEREIN

BACKGROUND OF THE INVENTION AND RELATED ART STATEMENT

The present invention relates to an article storage device and a shutter bendable in the sliding direction used therein. More particularly, the present invention relates to an article storage device installed at a console, a seat, and a door lining in a passenger room of a vehicle to store or hold an article, such as small or miscellaneous goods, a drink container, or a cellular phone.

FIGS. 13(a) through 13(c) shows three examples of conventional article storage devices installed in a door lining. FIG. 13(a) shows an article storage device disclosed in Japanese Utility Model Publication (KOKAI) No. 62-33335. The article storage device in FIG. 13(a) is formed of a storage section 51, which is provided at a corner section of an upper surface of an arm rest 50 and opened to have a substantially L-shape in section, and a cover 52 having a substantially inverted L-shape in section in correspondence with the storage section 51. The cover 52 is rotatably assembled with a lower rim of the storage section 51 on the room side through a pivotal shaft 53. In a case that a container K or the like is placed in or taken out from the storage section 51, the cover 52 is moved around the pivotal shaft 53 as a supporting point or fulcrum such that the cover 52 is switched between a closed position for covering the storage section 51 and an opened position rotated to the room side in a use state.

The storage devices shown in FIGS. 13(b) and 13(c) have a common feature in that storage sections 54, 57 are provided in a concave form at the upper surface of the arm rest 50 and the container K or the like can be inserted into the concave space from right above the storage sections 54, 57. In the device shown in FIG. 13(b), a cover 55 is rotatably assembled with a rim of an upper opening of the storage section 54 through a pivotal shaft 56, and the cover 55 is moved around the pivotal shaft 56 as a fulcrum such that the cover 55 is switched between the closed position for covering the upper opening of the storage section 54 and the opened position rotated toward the outside. In the device shown in FIG. 13(c), a door or a cover 58 is assembled with a rim of the upper opening of the storage section 57 through a pivotal shaft 59 and an urging spring 60, and the cover 58 is movable around the pivotal shaft 59 such that the cover 58 is switched between the closed position for covering the upper opening of the storage section 57 and the opened position rotated to the inside by resisting against a spring force of the urging spring 60. Incidentally, the storage sections 51, 54, 57 can be used as a storage section for storing the article other than the container.

All of the conventional structures described above are simple and convenient for holding the container or for placing in and taking out the container. The structures shown in FIG. 13(b) and FIG. 13(c) are excellent in that the cover 55 or 58 does not protrude to the room side as compared with the structure in FIG. 13(a). The structure in FIG. 13(c) is excellent in that the cover 55 at the opened position gets out of the way when taking out the article or the container K. However, in the conventional structure, in order to secure the article storing ability and container holding ability, the storage section needs to have an enough depth to a certain degree. As the depth of the storage section is increased, the ability of placing in and taking out the article is impaired, and an operation of opening and closing the cover is deteriorated. Also, in case that the installation site of the storage section 51, 54, or 57 is located at an uprising wall 61a of the door lining 61 as schematically shown in FIG. 13(c), when the article or the container K is placed in or taken out from the storage section 57, the drink container K hits the uprising wall 61a to make the uprising wall 61a dirty. Further, since the storage device is protruded significantly to the room side, the safety and the appearance thereof are deteriorated.

As the door or cover used in the storage device, there is a shutter guided by a guide groove provided along a rim of an opening of the storage section of the device. The shutter slides along the guide groove to thereby open and close the opening of the storage section as shown in FIGS. 14(a) to 14(c). A structure shown in FIG. 14(a) has been disclosed in Japanese Patent Publication (KOKAI) No. 54-33442. In the structure shown in FIG. 14(a), an upper opening of a storage device 50 is opened and closed by a shutter 53. Namely, the device 50 is formed of a case body 51 forming a storage section 51a opened at the upper side thereof, and a cover 52 provided with an opening 52a for covering the case body 51 from above. A guide groove for guiding the sliding movement of the shutter 53 is formed between the case body 51 and the cover 52. A shutter 53 includes a shutter main body 54 bendable through thin wall sections 54a, and a large number of projections 55 projected at both sides of the main body 54. The projections 55 are fitted in the guide groove, and the shutter 53 is moved from a closed position for closing the upper opening of the storage section 51a to an opened position by sliding toward the left lower side in the figure, in which the shutter does not interfere the storage section 51a.

A structure shown in FIG. 14(b) has been disclosed in Japanese Patent Publication (KOKAI) No. 07-82967. In the structure shown in FIG. 14(b), a front opening of a storage device 56 is opened and closed by a shutter 58. Namely, the storage device 56 has a case body 57 opened at a front side, and guide grooves are formed in the vertical direction at both rims of an opening. The shutter 58 is formed in a plate shape with the upper and lower surfaces connected by a plurality of connecting pieces. A large number of notched grooves are formed at the upper or lower surface, so that the shutter 58 can be bent. Both sides of the shutter 58 are fitted in the guide grooves, and the shutter 58 is moved from the closed position for closing the front opening of the case body 57 to the opened position by sliding toward an upper inner surface side of the storage device.

A structure shown in FIG. 14(c) has been disclosed in Japanese Patent Publication (KOKAI) No. 08-192685. In the structure shown in FIG. 14(c), an upper opening of a storage device 59 is opened and closed by a shutter 61. The storage device 59 constitutes a case body 60 opened at an upper side, and guide grooves 62 are formed at both rim portions of the opening. The shutter 61 is formed of two layers, that is, a lower core layer and an upper layer, and includes a large number of projections and warp prevention pieces 61a at both sides of the shutter 61. The projections and the warp prevention pieces 61a are fitted in the guide grooves 62. The shutter 61 is moved from a closed position for closing the upper opening of the case body 60 to an opened position by sliding toward a right lower side in the figure, in which the shutter 61 does not interfere the case body 60.

The shutters described above are respectively formed of molded resins. When the shutter is switched from the closed position to the opened position, the shutter slides towards the position where the shutter gets out of the way of the storage device side. Therefore, the guide groove includes a curved section which includes a guide section corresponding to the curved section, and the shutter main body is bendable such that the shutter main body fits the curved section. Therefore, in designing the shutter, in addition to the appearance characteristics and the processing property, it is desirable that the shutter slides without rattling. It is also desirable to improve the flexibility at the curved section in the guide groove and have the good sliding ability. This is because a stronger force is required for sliding as the curvature of the guide groove is increased. On the contrary, if the fitting between the guide groove and the projections is loosely set, the rattling tends to occur.

In view of the foregoing, the inventor has studied the working characteristics of the conventional shutters. FIGS. 11(b) and 11(c) show a relationship between the shutter main body and the projections with respect to the guide grooves in the conventional shutters. Numeral 64 designates a guide groove formed in a substantially U-shape disposed at each rim portion of the opening of the storage device side. Numerals 65 and 67 designate shutter main bodies. The shutter main body 65 includes thin walled portions 65a via recessed portions in the width direction on upper and lower surfaces of the main body 65. The shutter main body 67 includes thin walled portions 67a via recessed portions in the width direction on an upper surface of the main body 67. Numeral 66 designates substantially semicircular projections projected at both side surfaces of the shutter main body 65, and numeral 68 designates circular projections projected at both side surfaces of the shutter main body 67. FIGS. 11(b) and 11(c) respectively show the examples in which the guide groove 64 constitutes the curved section. The sliding force of the shutter is proportional to a sum of a reaction force generated when the projections 66 or 68 try to follow the curved portion, and a reaction force generated when the main body 65 or 67 is bent through the thin walled portions 65a or 67a.

In the conventional structures, since the projections 66 and 68 are respectively projected substantially parallel to the side surfaces of the main bodies 65 and 67, the main bodies 65, 67 almost fit within the width of the U-shaped guide grooves 64. Thus, the main body and the projection have almost the same bending curve R when they are bent at the curved section. As a result, the sliding ability is deteriorated since the main bodies 65 are 67 are hard to bend by the stress received from the projections 66 and 68, or since the projections 66 and 68 tend to receive the reaction force generated when the main bodies 65 and 67 are bent and deformed. Also, in the conventional shutters, since the main body and the thin walled portion are formed of the same material, in order to secure the flexibility at the thin walled portion while maintaining the rigidity of the main body, the recessed portions corresponding to the thin walled portions are likely to deteriorate the appearance of the shutter extremely.

Accordingly, objects of the invention are to solve the aforementioned problems. More specifically, one object of the invention is to provide a storage device, in which the ability of placing in and taking out the article and the property of holding the same stably are improved while the storage device can be used in many purposes, that is, the storage section thereof is excellent for holding small articles, or for holding relatively elongate articles, such as a PET bottle, to thereby improve the commercial value of the storage device.

Another object of the invention is to provide a shutter for covering the storage device, in which the rigidity, appearance characteristic and sliding ability of the shutter can be maintained optimally even if the curvature of the guide groove is increased, and the shutter can be held at any positions even when the shutter is disposed vertically or longitudinally, to thereby expand the application of the shutter.

Further objects and advantages of the invention will be apparent from the following description of the invention.

SUMMARY OF THE INVENTION

To achieve the aforementioned objects, the present invention provides an article storage device disposed in a passenger room of a vehicle. The article storage device comprises a storage section formed of side surfaces provided with protruded rim portions for holding an article therein, and a shutter for opening and closing an opening of the storage section. The storage section has side surfaces, a back surface and an inner bottom surface for dividing an inside thereof. The storage section includes guide grooves formed along protruded rim portions, and the shutter bendable in a sliding direction is slidably assembled with the guide grooves.

In the article storage device of the invention, an inside of the storage section is substantially partitioned by the side surfaces, the back surface, and the inner bottom surface, and the storage section is opened at a front side (passenger room side) thereof. The opening of the storage section is opened and closed by the shutter sliding along the guide grooves formed at the protruded rim portions at both sides of the storage section. Considering a case that the article storage device is disposed at the interior wall of the room, for example, since the storage section is opened at the upper side and the front side, even if the article held therein is a small article, such as a key, the article can be placed in or taken out from the lateral or horizontal direction, so that the ability of placing in or taken out from the device is improved as compared with the conventional structure with the upward opening. In addition, the storage device of the invention can easily hold even the articles, which are large-sized or small-sized containers, cans, or bottles as shown in embodiments of the invention. Also, since the shutter slides along the guide grooves formed at the protruded rim portions at both sides of the storage, even if the shutter is at the maximum opened position, the shutter does not protrude toward the room side of the vehicle, so that the safety and the appearance thereof can be easily maintained.

It is preferable to have the following structures in the article storage section.

Firstly, it is preferable that the shutter can be held at an arbitrary position in the guide grooves. In this case, in addition to the aforementioned advantages, depending on a size or length of the article to be held, the opened position of the shutter is adjusted, in other words, the shutter is stopped at the arbitrary position before the shutter reaches the maximum position after sliding from the closed position, so that the opening of the storage section can be suitable for the article.

Secondly, it is preferable that the storage device includes a holding section formed in a cylindrical form with a bottom, and the holding section provided for holding a drink container as the article is disposed at the inner bottom surface of the storage section. This structure provides an added value to the storage device of the invention. In this structure, the storage section is formed of the side surfaces, the back surface and the inner bottom surface to be opened at the upper and front sides. The opening of the storage section is opened and closed by the shutter. Thus, even if the cylindrical holding section with the bottom is disposed, by merely setting the inner bottom surface of the storage section at a substantially middle section in the vertical direction as shown in the embodiment, it becomes invisible by the shutter, so that the appearance of the device can be easily maintained. Also, by adjusting the opened position of the shutter as described above, drink containers with the different heights can be stably held by the storage device.

Thirdly, it is preferable that the holding section includes a first bottom receiving section provided substantially horizontally at an inner lower surface side of the cylindrical form of the holding section, and a second bottom receiving section having a diameter larger than that of the first bottom receiving section and inclined outwardly from a back surface side toward a front side or a shutter side. Supposing that the storage device of the invention is disposed at the interior wall or the door lining, a paper cup or small-sized can is held in the vertical state by the first bottom receiving section, and a large-sized can or bottle is maintained in a state that the large-sized can or bottle is inclined toward the room side, so that the holding ability and the ability of placing in and taking out from the device can be improved.

Fourthly, it is preferable that the shutter is moved to slide from a closed position, in which a distal end of the shutter abuts against the corresponding portion of the back surface, and a maximum opened position, in which stoppers provided at an inner surface of the shutter abuts against the inner bottom surface of the storage section to be regulated. This structure defines a sliding range of the shutter, and it will suffice to merely add the stoppers as a structure of regulating the shutter at the opened position, so that the structure can be easily made.

Fifthly, it is preferable that the shutter includes a shutter main body bendable at a plurality of thin walled portions, a plurality of projections formed at both sides of the main body, and hollow elastic portions formed at the projections. The projections and the elastic portions are fitted in the guide grooves, and the shutter can be held at an arbitrary position in the guide groove through the elastic portions. This structure has been devised to obviate the following problems. Namely, if the fitting between the guide groove and the projection is enhanced to be able to hold the shutter at the arbitrary position, the sliding characteristic is deteriorated. Therefore, this structure is provided with the hollow elastic portions, and accordingly, while the sliding characteristic is maintained due to the existence of the hollow elastic portions, the shutter can be held at the arbitrary position in the guide groove.

The shutter used in the article storage device of the invention is formed of a resin molding, and the guide groove at the storage device has a curved section. In addition, the projections are disposed lower than the main body by having a step between the main body and the projection, and the step therebetween is set such that a bending curve of the main body when being bent at the curved portion is deviated upwardly from the width of the guide groove.

Also, in the shutter used in the article storage device of the invention, the shutter main body and the projections are formed of a plurality of piece-shaped hard resin portions and soft resin portions. The hard resin portions extend in the width direction and are disposed at a predetermined interval in a sliding direction. The soft resin portions connect the hard resin portions in a state that the soft resin portions cover the design surfaces of the hard resin portions, and the soft resin portions form the thin walled portions between the hard resin portions.

Accordingly, the relative positional relationship between the shutter main body and the projection, that is, the projection is located lower than the main body by having the step between the projection and the main body, the bending curve of the main body when being bent at the curved section of the guide groove is deviated toward the upper side from the width of the guide groove. Accordingly, even if the curvature of the curved section of the guide groove is increased, the excellent sliding characteristic can be maintained. This is because of the following reason. Namely, in the invention, the bending curve of the main body is set to be larger than the bending line drawn by the projection, and at the same time, a distance between the projection and the main body and a distance between the projection and thin walled portion adjacent thereto are obtained, so that the main body can be more easily bent at the projections as supporting points, resulting in that the projection is difficult to receive the reaction force when the main body is bending.

In the conventional shutter, the shutter is formed of one of a hard resin structure, a soft resin structure, and two layer structure in which an inner surface is hard and an outer surface is soft. Thus, it is difficult to fulfill the conflicting characteristics, that is, the rigidity of the main body and the bending ability. However, in the shutter of the invention, the shutter is formed of a plurality of piece-shaped hard resin portions extending in the width direction and disposed at the predetermined interval in the sliding direction, and the soft resin portions connecting the hard resin portions in the state that the design surfaces of the hard resin portions, and the soft resin portions form the thin walled portions between the hard resin portions. Therefore, the rigidity of the main body and the rigidity of the projection can be obtained while the good bending characteristic is maintained, and the appearance is improved by reducing the sizes of the recessed portions (notches or grooves) corresponding the thin walled portions.

BRIEF DESCRIPTION OF THE DRAWINGS

FIGS. 3(a) and 3(b) are schematic views showing the detailed section of the article storage device shown in FIG. 1, wherein FIG. 3(a) is a front view thereof and FIG. 3(b) is a rear view thereof;

FIGS. 4(a) and 4(b) are schematic views showing the detailed section of the article storage device shown in FIG. 1, wherein FIG. 4(a) is a side view thereof and FIG. 4(b) is a cross sectional view taken along line 4(b)—4(b) in FIG. 2(b);

FIGS. 7(a) and 7(b) are explanatory views for explaining operations of the storage device shown in FIG. 1;

FIGS. 8(a) and 8(b) are explanatory views showing a modified example of the storage device;

FIGS. 14(a) to 14(c) are explanatory views showing three examples of the conventional shutters used in the article storage devices.

DETAILED DESCRIPTION OF PREFERRED EMBODIMENTS

Figure 1:
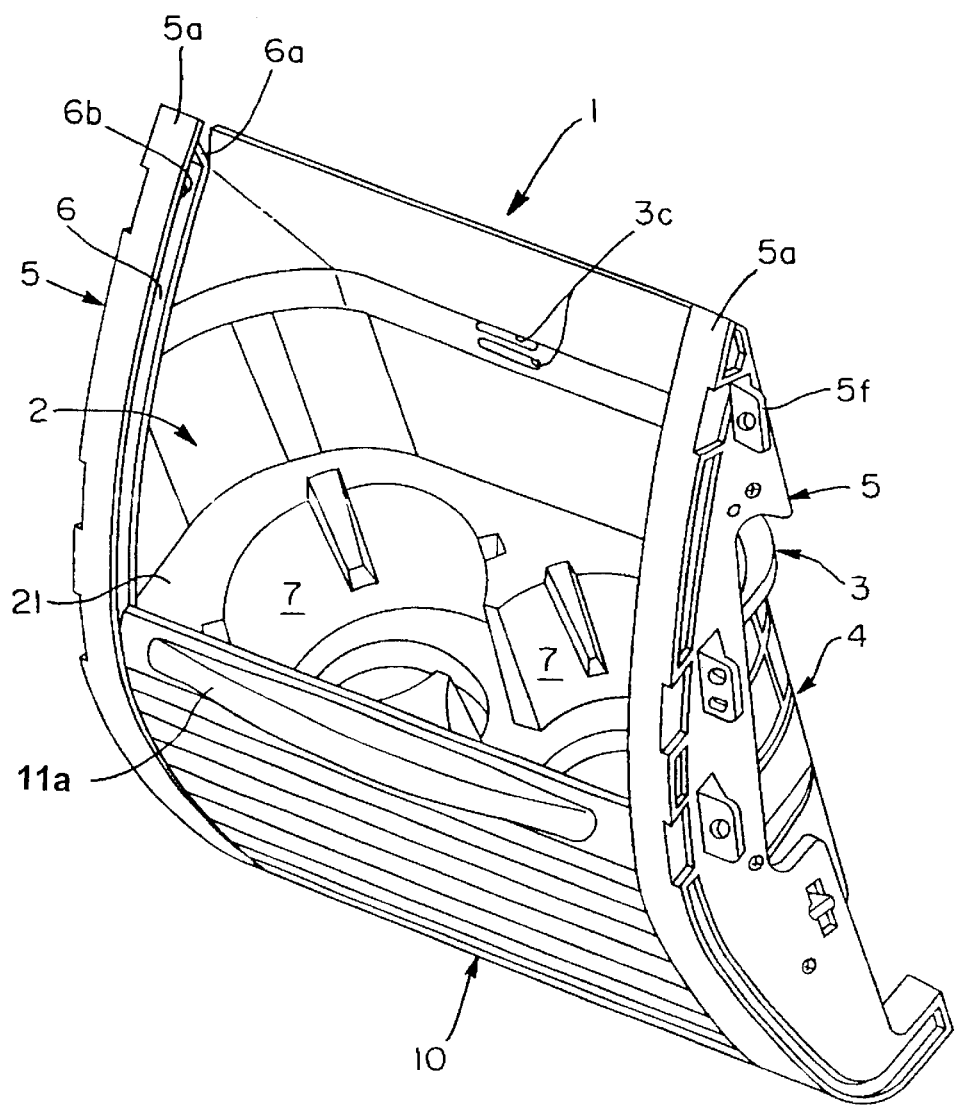
FIG. 1 is a schematic view showing an appearance of an article storage device of an embodiment of the invention.
Figure 2A:
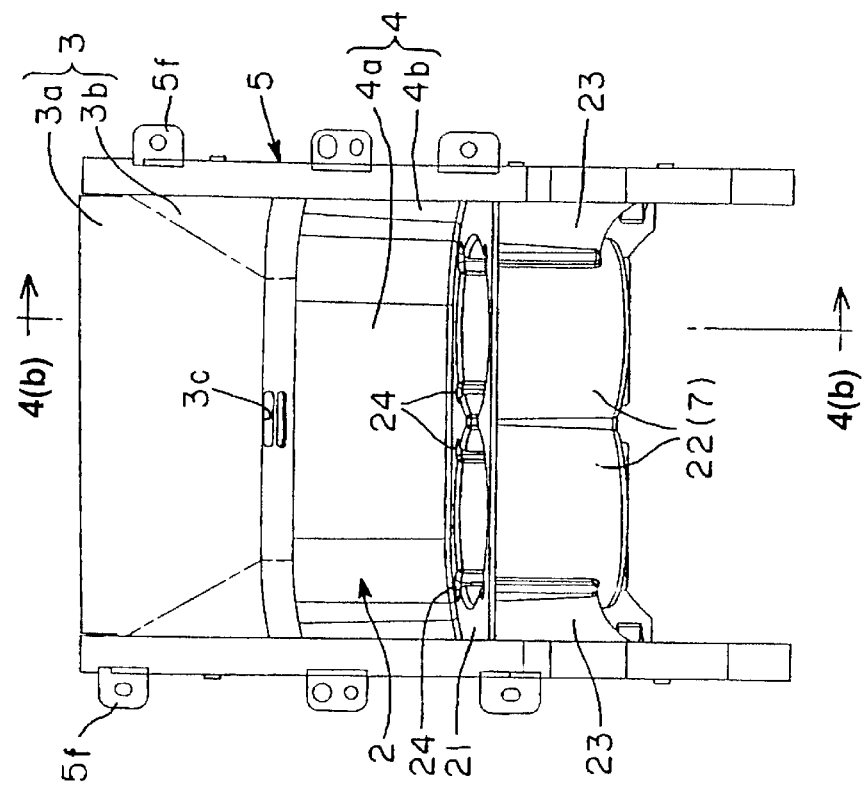
FIGS. 2(a) and 2(b) are front views showing a detailed section of the article storage device shown in FIG. 1.
Figure 2B:
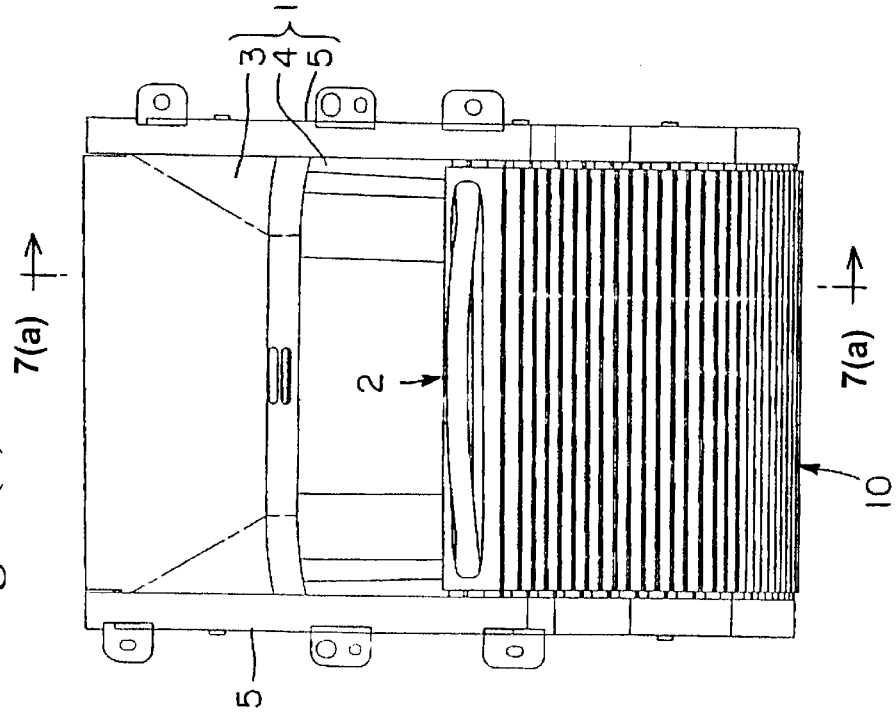
Figure 5A:
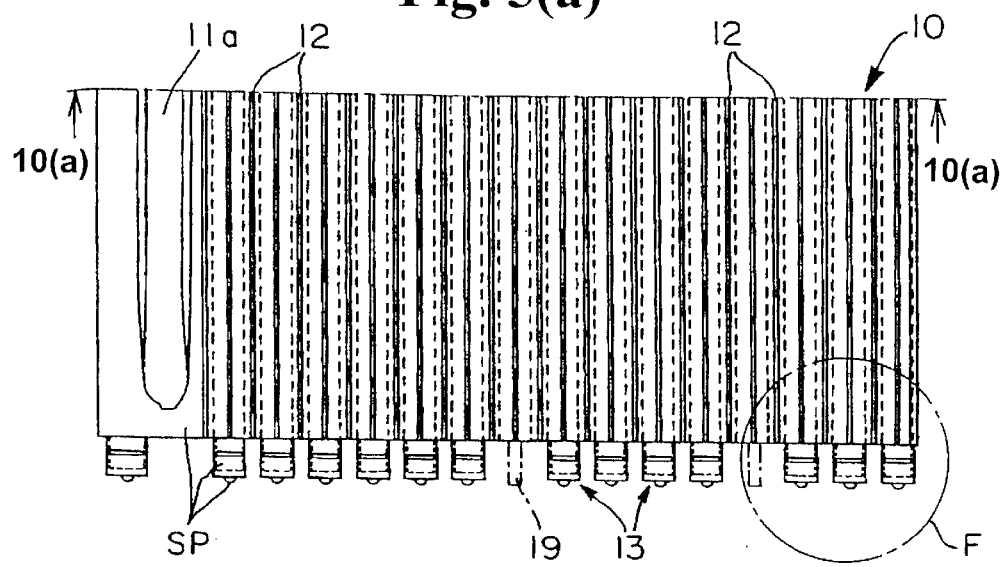
FIGS. 5(a) to 5(c) are schematic views showing a detailed section of a shutter of the invention shown in FIG. 1.
Figure 5B:
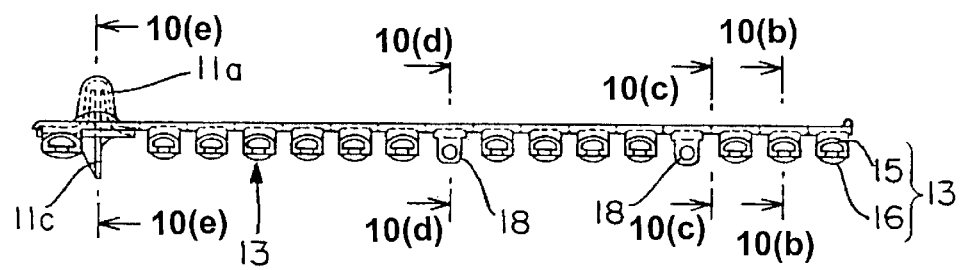
Figure 5C:
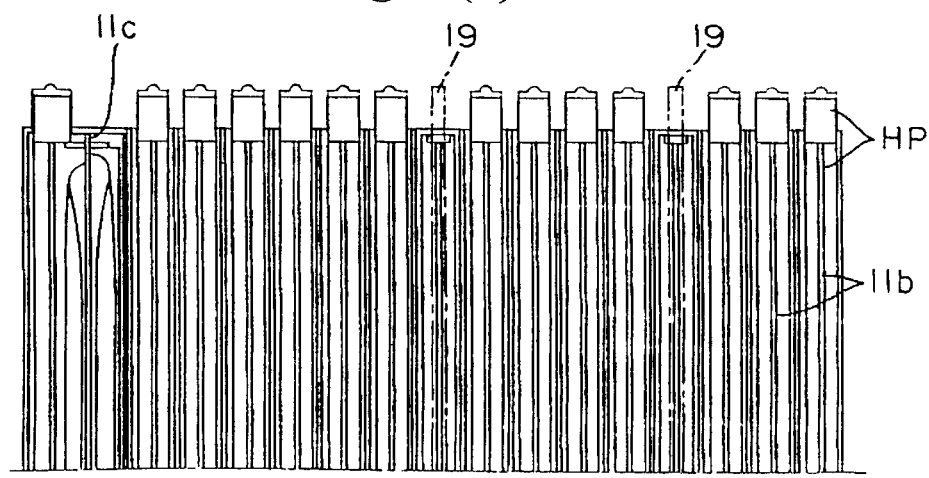
Figure 6A:
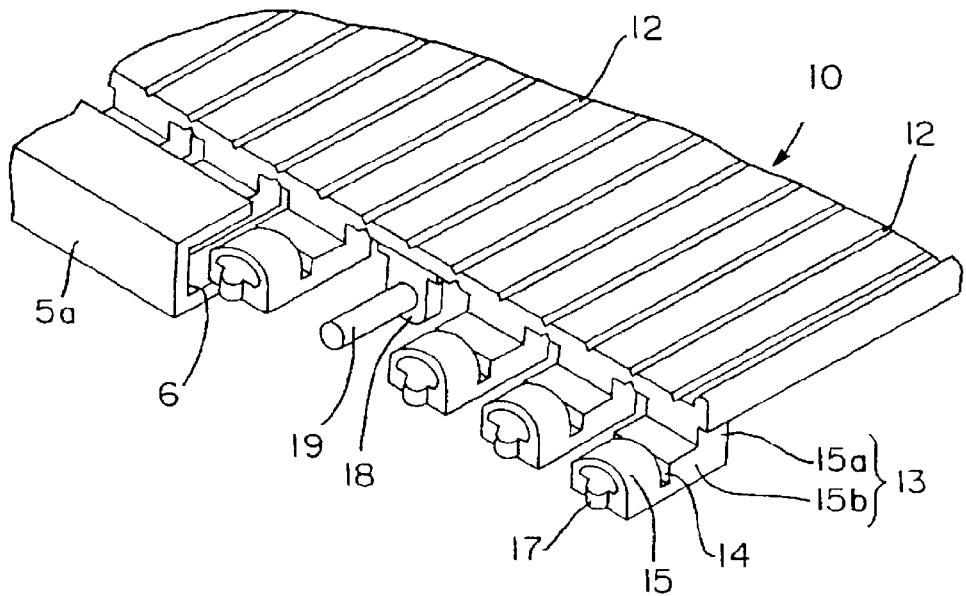
FIGS. 6(a) and 6(b) are enlarged views showing a main section of the shutter in FIG. 1, in which a section F shown by a chain line in FIG. 5(a) is enlarged.
Figure 6B:
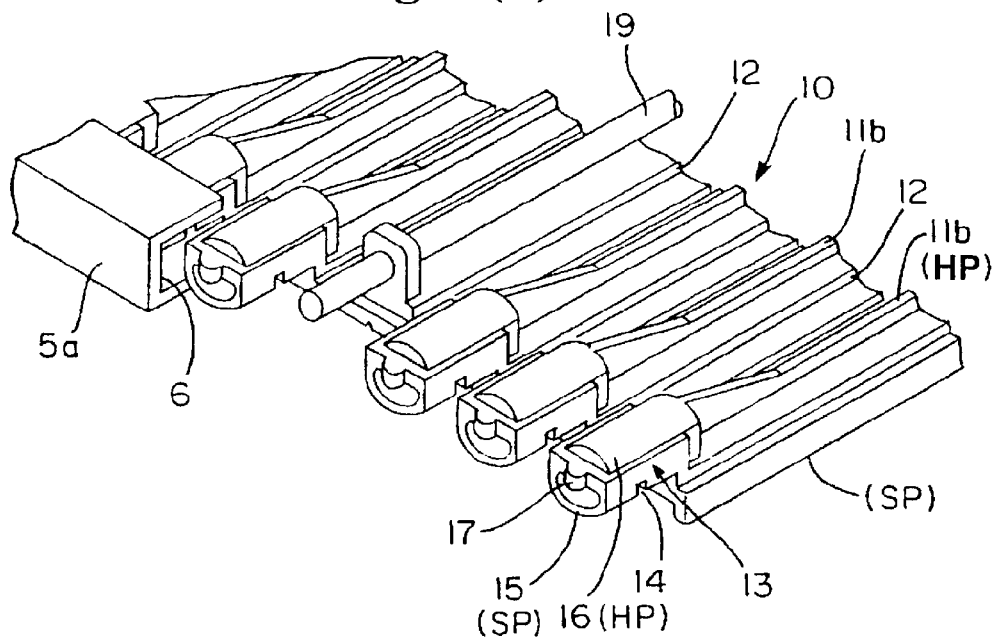

Now, embodiments of the invention will be explained with reference to the accompanied drawings. FIG. 1 is a schematic view showing an appearance of an article storage device of an embodiment of the invention, in which a shutter of the storage device is opened to its maximum. FIGS. 2(a) to 4(b) show details of the storage device. FIG. 2(a) is a front view in which the shutter is opened to its maximum, and FIG. 2(b) is a front view in which a shutter is omitted. FIG. 3(a) is a front view in which the shutter is at a closed position in the storage device, and FIG. 3(b) is a rear view thereof. FIG. 4(a) is a side view thereof, and FIG. 4(b) is a cross sectional view taken along line 4(b)—4(b) in FIG. 2(b). FIGS. 5(a) to 5(c) and FIGS. 6(a) and 6(b) show details of the shutter. FIG. 5(a) is a view showing a half of an upper surface of the shutter, FIG. 5(b) is a side view thereof, and FIG. 5(c) is a half of a rear surface of the shutter. FIG. 6(a) is an enlarged view of a main section in which a section F shown by a chain line in FIG. 5(a) together with a guide groove is enlarged, and FIG. 6(b) is a rear view of FIG. 6(a).

FIGS. 7(a) and 7(b) are explanatory views for explaining operations of the storage device shown in FIG. 1, wherein FIG. 7(a) is a schematic sectional view taken along line 7(a)—7(a) in FIG. 2(a), and FIG. 7(b) is a schematic sectional view showing a state that the shutter in the storage device is moved to slide slightly upwardly from the state shown in FIG. 7(a). FIGS. 8(a) and 8(b) show a modified example of the article storage device, in which FIG. 8(a) is a side view corresponding to FIG. 4(a), and FIG. 8(b) is a sectional view corresponding to FIG. 4(b).

Figure 9A:
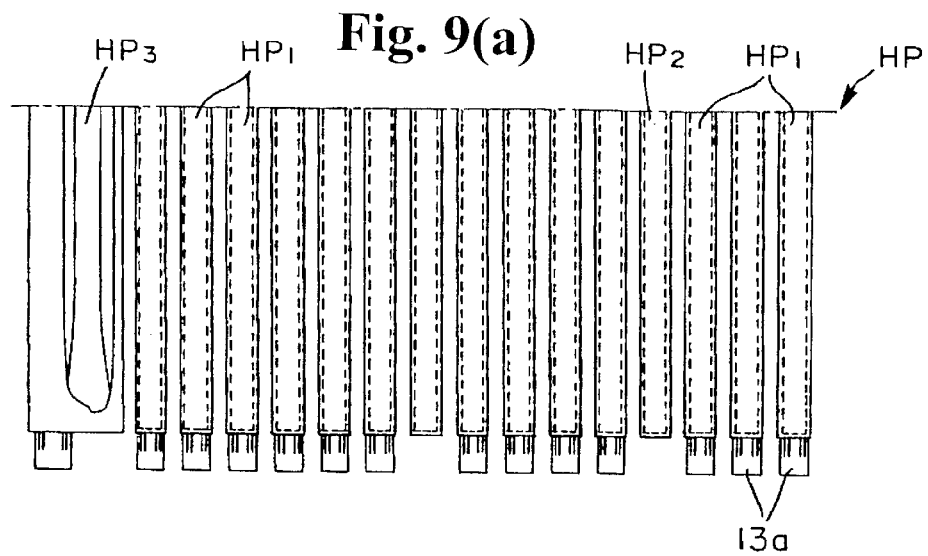
FIGS. 9(a) to 9(c) are schematic views for explaining steps of forming the shutter in FIG. 5(a)
Figure 9B:
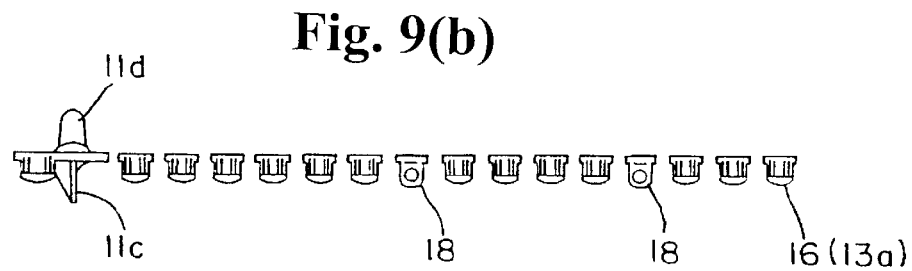
Figure 9C:
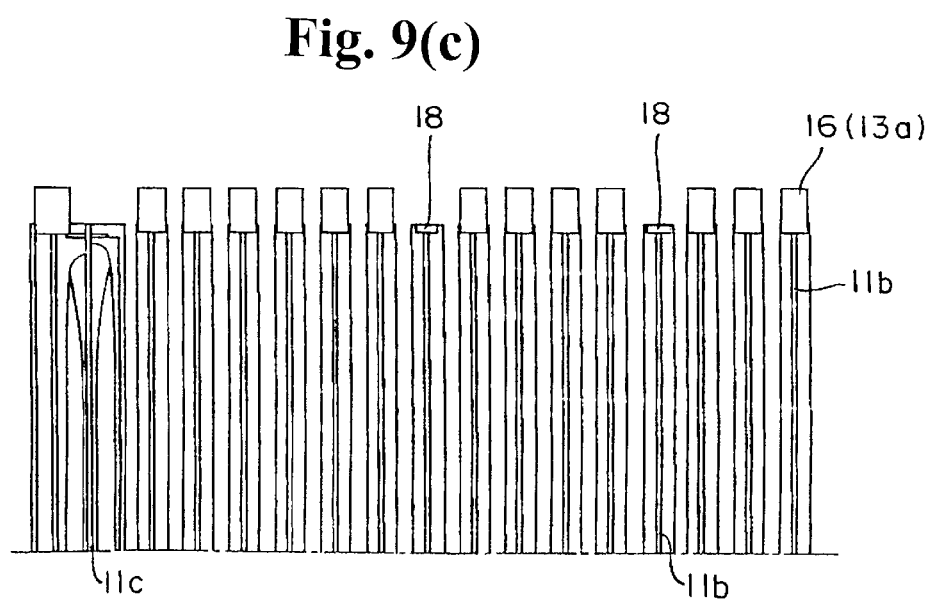
Figure 10A:
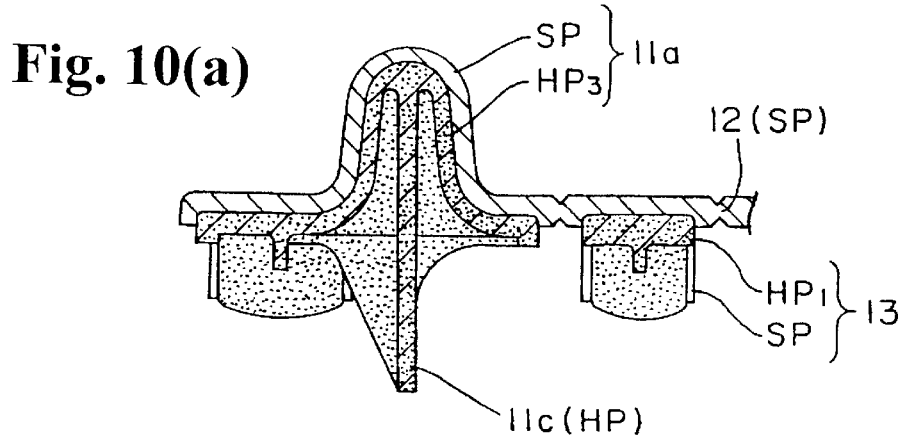
FIG. 10(a) shows a part of an enlarged sectional view taken along line 10(a)—10(a) in FIG. 5(a)
Figure 10B:
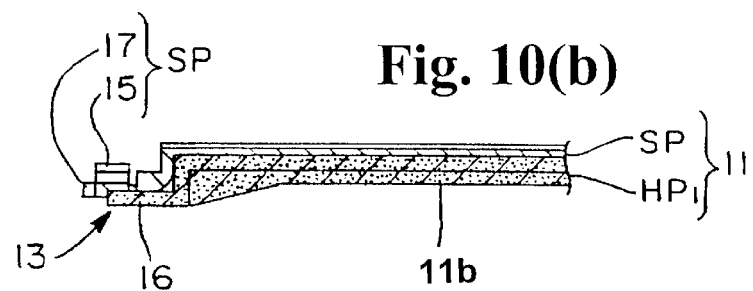
FIG. 10(b) shows a part of an enlarged sectional view taken along line 10(b)—10(b) in FIG. 5(b)
Figure 10C:
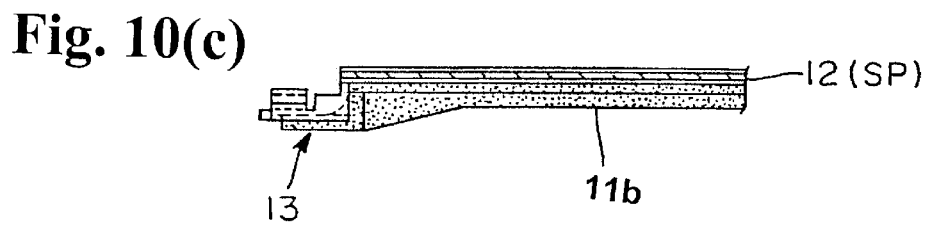
FIG. 10(c) shows a part of an enlarged sectional view taken along line 10(c)—10(c) in FIG. 5(b)
Figure 10D:
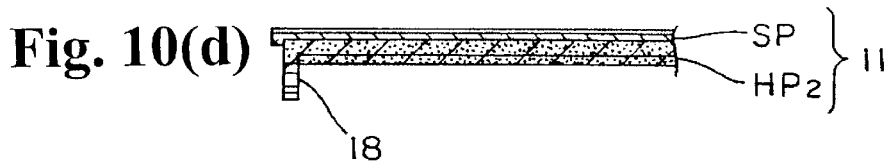
FIG. 10(d) shows a part of an enlarged sectional view taken along line 10(d)—10(d) in FIG. 5(b)
Figure 10E:
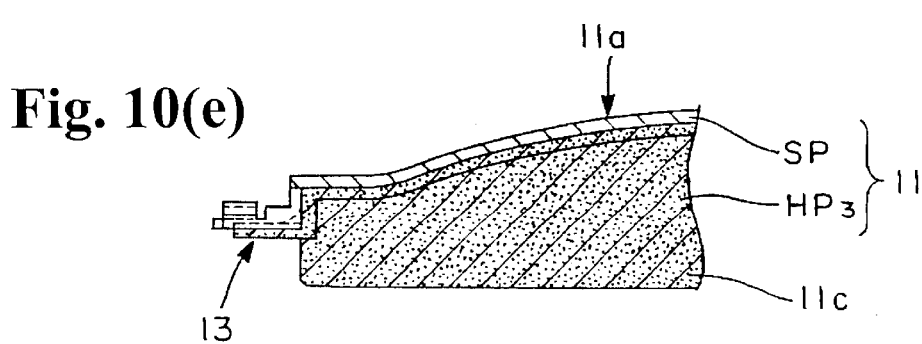
FIG. 10(e) shows a part of an enlarged sectional view taken along line 10(e)—10(e) in FIG. 5(b)
Figure 11A:
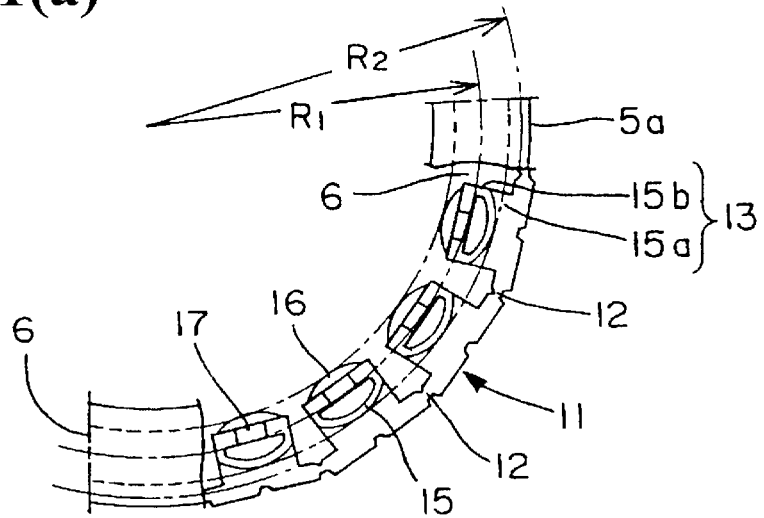
FIG. 11(a) is a schematic view showing a principle of an operation of the shutter of the invention.
Figure 11B:
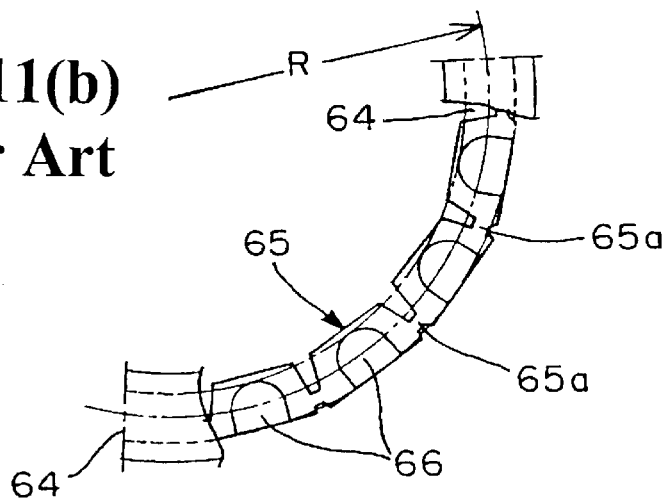
FIGS. 11(b) and 11(c) are schematic views showing a principle of an operation of the conventional shutter.
Figure 11C:
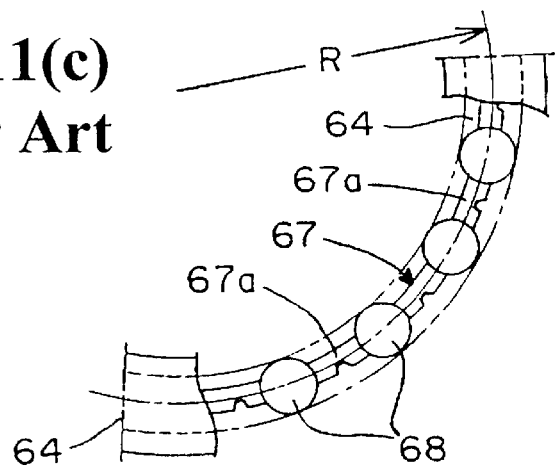
Figure 12:
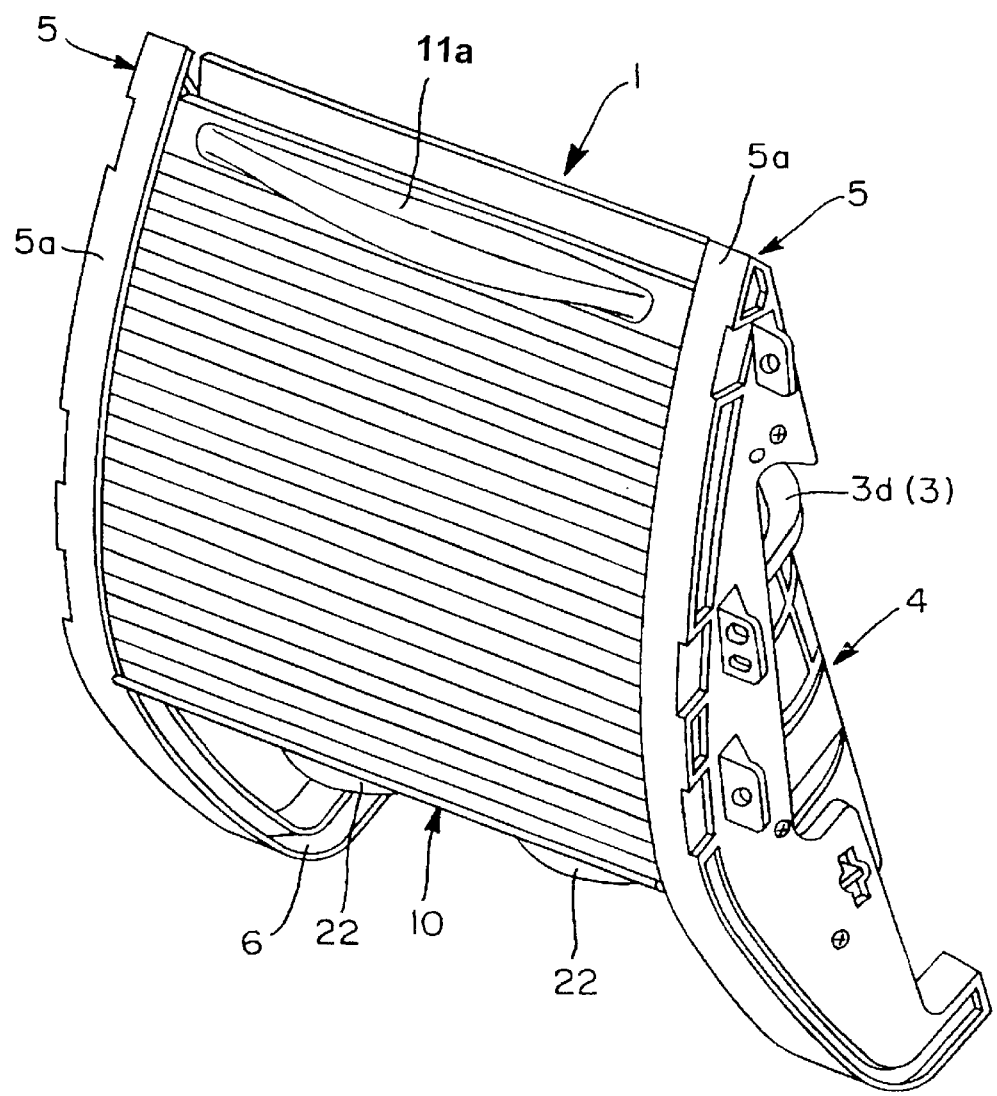
FIG. 12 is a schematic view of the storage device shown in FIG. 1, in which the shutter slides to a closed position.

FIGS. 9(a) to 9(c) are schematic views for explaining hard resin section in a method of forming the shutter in FIGS. 5(a) to 5(c), in which the views in FIGS. 9(a) to 9(c) correspond to FIGS. 5(a) to 5(c). More specifically, FIG. 9(a) is a view showing a half of the upper surface of the shutter, FIG. 9(b) is a side view thereof, and FIG. 9(c) is a half of the rear surface of the shutter. FIGS. 10(a) to 10(e) show details of the shutter. More specifically, FIG. 10(a) shows a part of an enlarged sectional view taken along line 10(a)—10(a) in FIG. 5(a), and FIG. 10(b) shows a part of an enlarged sectional view taken along line 10(b)—10(b) in FIG. 5(b). FIG. 10(c) shows a part of an enlarged sectional view taken along line 10(c)—10(c) in FIG. 5(b), FIG. 10(d) shows a part of an enlarged sectional view taken along line 10(d)—10(d) in FIG. 5(b), and FIG. 10(e) shows a part of an enlarged sectional view taken along line 10(e)—10(e) in FIG. 5(b). FIG. 11(a) is a schematic view showing a principle of an operation of the shutter of the invention as compared with the conventional examples shown in FIGS. 11(b) and 11(c). FIG. 12 is a schematic view of the storage device shown in FIG. 1, in which the shutter slides to a closed position.

An article storage device (hereinafter also referred to as a device) 1 includes a storage section 2 opened at an upper side and a front side thereof as shown in FIG. 1. In the article storage device 1, an opening of the storage section 2 is opened and closed by a shutter 10. The article storage device 1 is installed at an uprising wall of an interior wall, a door lining, a console or the like in a passenger room of a vehicle. The article storage device 1 is basically formed of upper and lower half bodies 3 and 4 forming the storage section 2, both side plates 5, and a shutter 10, and all of the constituents are formed of resin moldings. Incidentally, this structure includes a lamp 8 attached to a part of the upper half body 3 as shown in FIG. 3(b). Although not shown in the drawings, it is designed that an ashtray can be detachably attached to the storage as an option.

In the storage section 2, the upper half body 3 forms the rear surface of the storage section 2 and the lower half body 4 forms an inner side surface thereof. At the same time, a predetermined size of a storage space is partitioned by the upper half body 3, the lower half body 4, and the side plates 5, and the front side and the upper side of the storage section 2 are opened. Also, the storage section 2 includes guide grooves 6 formed along protruded rim portions 5a (front and lower side rim portions in the width direction of the plate) in the side plates 5.

Namely, as shown in FIGS. 2(a) and 2(b), the upper half body 3 forms an upper back surface portion 3a of the storage section 2, and upper side surface portions 3b laminated on upper inner sides of the side plates 5. A lower side of an intermediate section of the upper back surface portion 3a is provided with two through holes 3c in the forms of transverse grooves that are bored through in front and rear directions of the upper back surface portion 3a. A rear surface side of the upper back surface portion 3a is provided with positioning ribs and attachment ribs disposed at both sides of the through holes 3c. As shown in FIG. 3(b), the lamp 8 made into a unit is positioned and attached to the rear surface side with screws 9a. Incidentally, the lamp 8 is turned on and off by a switch disposed at an uprising wall side to which the storage device 1 is attached. A rear surface side of the upper side surface portion 3b is provided with positioning ribs and attachment ribs (not shown) with respect to the side plate 5. Also, a connection flange 3d is disposed at the lower side of the upper half body 3 (the upper back surface portion 3a and the upper side surface portions 3b).

As shown in FIG. 2(b), the lower half body 4 includes a lower back surface portion 4a disposed below the upper back surface portion 3a, lower side surface portions 4b disposed below the upper side surface portions 3b, and a holding section 7 disposed below the lower back surface portion 4a and the lower side surface portions 4b. In the lower half body 4, the lower back surface portion 4a, the lower side surface portions 4b, and the holding section 7 are integrally formed. The holding section 7 is formed of a flat wall 21 forming an inner bottom surface of the storage section 2; two cylindrical sections 22, which have cylindrical forms with bottoms and are opened at the flat wall 21; and side walls 23 disposed below both sides of the flat wall 21. The flat wall 21 is formed in a state that the front side thereof is displaced or tilted slightly downwardly from the back surface side thereof. Each cylindrical section 22 has a cylindrical shape, and a depth thereof is set at 5 to 8 cm. Two cylindrical sections 22 communicate with each other by a notch formed therebetween. An inner periphery of each cylindrical section 22 is provided with three attachment grooves 24 extending downwardly from the flat wall 21. By utilizing the attachment grooves 24, or utilizing the notch and the attachment grooves 24, the optional member described above can be attached later if necessary.

As shown in FIG. 4(b), first and second bottom receiving sections 25 and 26 are formed at a lower inner side of each cylindrical section 22. The first bottom receiving section 25 has a circular shape with a diameter smaller than the inner diameter of the cylindrical section 22, and forms the lowest surface in the cylindrical section 22, that is, a horizontal receiving surface. The second bottom receiving section 26 has a circular shape with a diameter substantially the same as the inner diameter of the cylindrical section 22, and is provided in the inclined state such that the second bottom receiving section 26 is tilted downwardly from the back surface side toward the front side. In other words, the second bottom receiving section 26 is formed in an inclined end surface in which the back surface side is high and the front side is lowered to be closer to the first bottom receiving section 25. Outer surfaces of the sidewalls 23 are provided with two attachment holes and positioning ribs 27.

Two side plates 5 are laterally symmetrical, and elongated in a vertical direction as shown in FIGS. 4(a) and 4(b). At the same time, the upper and lower sides of each side plate 5 are in a curved form, and the guide groove 6 is integrally formed at the protruded rim portion 5a. The protruded rim portion 5a protrudes mostly forwardly at a substantially intermediate portion thereof in a vertical direction. A vertical dimension of each side plate 5 is set at such a length that the side plate 5 extends downwardly longer than the corresponding portion of the upper and lower half bodies 3 and 4 connected to the upper and lower sides of the side plate 5. The outer surface of each side plate 5 is provided with a positioning hole 5b and a through hole 5c, which respectively correspond to the positioning rib and the attachment rib in the upper half body 3; a positioning hole 5d and a through hole 5e, which respectively correspond to the positioning rib 27 and the attachment hole in the lower half body 4, and three attachment pieces 5f.

The guide groove 6 has a substantially U-shape in section, and is curved in accordance with the protruded rim portion 5a. Then, an upper end side of the guide groove 6 extends toward the back surface side, and an upper end of the groove 6 is closed by a regulating wall 6a. A lower end side of the guide groove 6 extends toward the back surface side, and a lower end of the groove 6 is opened. In the guide groove 6, a regulation convex portion 6b is projected toward an inside of the groove at a portion slightly before the regulating wall 6a.

In assembling the respective members described above, for example, after the lower half body 4 is made in contact with the upper half body 3 such that the upper rim portion of the lower back surface portion 4a and the upper rim portions of the lower side surface portions 4b abut against the flange 3d, the side plates 5 are positioned and disposed by the engagement between the positioning ribs 27 and the positioning holes 5d or the like. Then, in this state, screws 9b are inserted from the through holes 5c, 5e to engage the attachment ribs and the attachment holes described above. In the assembled state, the upper half body 3, the lower half body 4, and the side plates 5 are formed in a continuous structure, and the storage section 2 opened at the upper and front sides is formed. In this assembly, the shutter 10 is assembled with the storage section 2.

The shutter 10 formed of a molded resin has a substantially rectangular plate shape as a whole. As shown in FIG. 5(a) to FIG. 6(b), the shutter 10 includes a shutter main body 11 bendable in a sliding direction at thin walled portions 12; a plurality of projections 13 formed at both sides of the main body 11; an elastic portion 15 and a circular arc portion 16 (also referred to as abutting portions 15 and 16) formed on upper and lower surfaces or front and rear surfaces of each projection 13; and small convex portions 17 formed at the end surface of the projection. The shutter main body 11, a plurality of projections 13, the elastic portions 15, the circular arc portions 16, and the small convex portions 17 are integrally formed.

The shutter main body 11 is bendable by means of a plurality of thin walled portions 12 formed in the width direction thereof, and has a length to cover the cylindrical sections 22 substantially from the upper side of the side plates 5 as shown in FIG. 3(a). Also, the width of the shutter main body 11 is set to be slightly smaller than the length between the guide grooves 6. Namely, the shutter main body 11 has a length for covering substantially from above the opening of the storage section 2 to slightly above the flat wall 21, and has a width slightly smaller than the dimension between the protruded rim portions 5a at both sides in which the guide grooves 6 are formed. The main body 11 is provided with a knob section 11a disposed at a distal end side thereof and projected toward an outer surface side much further; reinforcing ribs 11b disposed at the inner surface side of the main body 11 and projected at the positions corresponding to the projections 13 at both sides; and a stopper 11c projected much further toward the side opposite to the projecting direction of the knob section 11a.

The projections 13 are located at both sides of the main body 11, and disposed respectively between the thin walled portions 12. Each projection 13 has a substantially L-shape connected to an inner surface of the main body, and the projection 13 is located lower than the main body 11 for a length corresponding to a vertical portion 15a of the L-shape. A horizontal portion 15b of the L-shape in the projection 13 is provided with a groove 14, and a distal end portion of the horizontal portion 15b located ahead of the groove 14 constitutes a portion fitting with the guide groove 6. This portion, that is, the distal end portion of the horizontal portion 15b, includes the hollow abutting portion or elastic portion 15 formed on an outer surface thereof, that is, an upper surface in FIG. 6(a); the abutting portion or circular arc portion 16 formed on an inner surface thereof, that is, a lower surface thereof in FIG. 6(a); and the small convex portion 17 formed at an end surface thereof. More specifically, the elastic portion 15 has a hollow dome shape, and has an excellent elastic property. The circular arc portion 16 has a circular arc shape. The small convex portion 17 is provided at a middle of the end surface of the horizontal portion 15b, and located between the elastic portion 15 and the circular arc portion 16 in a vertical direction.

When each projection 13 is fitted in the U-shaped groove of the guide groove 6 through the semi-circular elastic portion 15 and the circular arc portion 16, the small convex portion 17 makes point-contact with an inner surface of an intermediate portion of the U-shape of the guide groove 6. Incidentally, although almost all of the projections 13 except the projection 13 located at a left side in FIGS. 5(a) to 5(c) are disposed at the substantially equal interval, tongue-like vertical wall portions 18 are provided instead of the projections 13 at two places. Each vertical wall portion 18 is provided with a mounting hole. A reinforcing shaft 19 is attached to the vertical wall portions 18 located both sides. However, the vertical wall portions 18 and the reinforcing shafts 19 may be omitted.

The shutter 10 described above is formed by a two-material molding method, and materials thereof are indicated below. Incidentally, FIGS. 9(a) to 9(c) show portions formed of a hard resin at the time of a primary molding, and FIGS. 5(a) to 5(c) and FIGS. 10(a) to 10(e) show a state that the shutter is secondarily formed by a soft resin from the state shown in FIGS. 9(a) and 9(c). In FIGS. 10(a) to 10(e), portions filled with small dots indicate hard resin portions HP molded by the primary molding, and portions without small dots indicate soft resin portions SP molded by the secondary molding. Here, the hard resin material, such as ABS (acrylonitrile-butadiene-styrene) or polypropylene, is used in the primary molding, and forms a plurality of (thirteen) hard resin portions HP1 in the shapes of pieces forming the reinforcing ribs 11b and preliminary projections 13a corresponding to the projections 13; two hard resin portions HP2 in the shapes of pieces corresponding to the reinforcing rib 11b and the vertical wall section 18; a hard resin portion HP3 in the shape of a piece constituting the stopper 11c and a preliminary knob portion 11d corresponding to the knob section 11a.

In this case, as understood by the comparison between FIGS. 9(a) to 9(c) and FIGS. 5(a) to 5(c), in the hard resin portion HP1, the reinforcing rib 11b is projected on a thin, elongate core plate, and the substantially L-shaped preliminary projections 13a are integrally formed with both sides of the core plate. In the hard resin portion HP2, the reinforcing rib 11b is projected on a thin, elongated core plate, and the vertical wall portions 18 with the mounting holes are projected integrally at both sides of the core plate. In the hard resin portion HP3, the preliminary knob portion 11d, the stopper 11c, the reinforcing rib 11b and the preliminary projections 13a are integrally projected from the upper and lower side and at distal end sides of a thin, relatively wider core plate.

After the hard resin portions HP1, HP2 and HP3 are formed in a metallic die, the secondarily molding is performed. A soft resin material, such as a polyester elastomer and a polypropylene elastomer, is used in the secondary molding. In a state that a soft resin portion SP covers design surfaces (upper surfaces) of the respective hard resin portions HP1, HP2 and HP3, the hard resin portions HP1, HP2 and HP3 are connected, so that the thin walled portions 12 are formed between the hard resin portions HP1, HP2 and HP3. Therefore, in the shutter 10, as shown in FIGS. 10(a) to 10(e), the portions except the hard resin portions HP1, HP2 and HP3 described above constitute the soft resin portion SP formed of the soft resin. In other words, portions forming the thin walled portions 12 and the upper surface (front surface) side of the main body 11, the upper surfaces (front surfaces), both side surfaces, distal end surface portions of the projections 13, the elastic portions 15 and the small convex portions 17 constitute the soft resin portion SP formed of the soft resin.

In the shutter structured as described above, as shown in FIG. 6(a), FIG. 6(b) and FIG. 11(a), the abutting portions 15, 16 of each projection 13 make point-contact with the opposed surfaces of the U-shape of the guide groove 6. The small convex portion 17 of each projection 13 makes point-contact with the inner surface of the intermediate portion of the U-shape of the guide groove 6. Therefore, in this structure, even if the guide groove 6 is curved as shown in FIG. 11(a), the shutter 10 can smoothly slide as compared with the conventional one, so that the shutter 10 has an excellent sliding characteristic. This is attributed to the hinge structure, in which the thin walled portion 12 has excellent flexibility; a step structure, in which the projection 13 has a step corresponding to the length of the vertical portion 15a of the L-shape with respect to the main body 11; and a dome structure, in which the abutting portion or elastic portion 15 is excellent in the deformation operation.

Namely, in the hinge structure of the shutter main body 11 described above, the soft resin portions SP cover the upper surface sides of a number of pieces of the hard resin portions HP to connect the same. Since the thin walled portions 12 are formed between the hard resin portions HP, while the rigidity as a whole is provided by the hard resin portions HP, the flexibility of the thin walled portions 12 can be obtained at the soft resin portions SP as designed.

In the step structure, as shown in FIG. 11(a), the projection 13 is formed in the substantially L-shape, and the horizontal portion 15b of the L-shape fitted in the guide groove 6 is one step down from the main body 11, that is, the horizontal portion 15b is located below the main body 11. Accordingly, in proportion to the step or difference in the height, the bending curve R2 of the main body 11 at the time of being bent at the curved section of the guide groove 6 is deviated upward, that is, an outer side in FIG. 11(a), than the groove width of the guide groove 6. In short, the bending curve R2 of the main body 11 is set to be larger than the bending curve R1 of each projection 13 (abutting portions 15, 16), in other words, R2>R1. A distance between the projection 13 (the abutting portions 15, 16) and the main body and a distance between the projection 13 and the adjacent thin walled portion 12 are obtained, so that the main body 11 can be easily bent at the projections 13 as supporting points. Thus, the reaction force at the time of bending the main body 11 is suppressed from being applied to the projections 13 (the abutting portions 15, 16).

In the dome structure, the abutting portion or elastic portion 15 is formed of the soft resin portion SP. At the same time, the elastic portion 15 is formed to be hollow and partitioned by the groove 14. Therefore, the elastic portion 15 has an excellent elastic flexibility, and even if the curvature of the guide groove 6 is increased, the sliding resistance can be easily decreased by the elastic flexibility of the dome shaped abutting portion 15.

After the distal end side of the shutter 10 described above on the knob section 11a side, for example, is disposed at the opened lower groove ends of the guide grooves 6 at both sides, and the projections 13 at the distal end side of the shutter 10 are fitted with the corresponding guide grooves 6, the shutter 10 slides along the guide groove 6 from the lower side toward the upward direction. At the time of this sliding movement, since the stopper 11c abuts against the front side of the flat wall 21 described above from below as shown in FIG. 7(a), one of the side plates 5 is slightly separated from the corresponding portions of the upper and lower half bodies 3 and 4 by loosening the screw 9b. Accordingly, the stopper 11c moves beyond the flat wall 21, and the shutter 10 is slidable in the upward direction along the guide grooves 6 through the projections 13. Needless to say that the foregoing description is just an example, and the shutter 10 is also assembled when the constituents are assembled in an actual manufacturing line.

In the article storage device 1 structured as described above, the storage section 2 is opened and closed by the sliding operation of the shutter 10. The shutter 10 slides from the maximum opened position (fully opened state) as shown in FIG. 1, FIG. 2(a) and FIG. 7(a) to the closed position shown in FIG. 3(a) and FIG. 12, and as shown in FIG. 7(b), the shutter 10 can be held at any place (any position) between the maximum opened position ad the closed position. Namely, in the maximum opened position, the stopper 11c abuts against the flat wall 21 to regulate the lower movement of the shutter 10. Also, in the shutter 10, the elastic portion 15 and the circular arc portion 16 of each projection 13 are elastically in contact with the opposed surfaces of the U-shape of the guide groove 6. The small convex portion 17 of each projection 13 makes point-contact with the inner surface of the intermediate portion of the U-shape of the guide groove 6. Therefore, even if the guide groove 6 is curved, the shutter 10 smoothly slides by the bending operation of the thin walled portions 12 and the deformation of the elastic portion 15, and the shutter 10 does not rattle even when vibrated.

In this case, since the elastic portion 15 and the circular arc portion 16 respectively abut against the opposed surfaces of the U-shape of the groove and the elastic portion 15 is formed to be hollow or an inside thereof is removed to have an excellent elastic property, the guide groove 6 can be elastically held, even when an occupant of the vehicle moves the shutter 10 to slide to an arbitrary position by grabbing the knob section 11a by a hand, and then releases the knob section 11a from the hand. When the shutter 10 is moved to slide further upwardly from the state shown in FIG. 7(b), the corresponding projections 13 (projections 13 located at the distal end side of the shutter 10) pass through the regulating convex portions 6b of the guide grooves 6 while being elastically deformed, and then abut against the regulating walls 6a to be stopped, so that the shutter 10 is held at the closed position for completely closing the opening of the storage section 2. Since the elastic force of the elastic portion 15 also acts on the shutter 10 in addition to the regulating convex portions 6b, this holding force securely prevents the shutter 10 from inadvertently moving downwardly even if the excessive vibration is applied to the shutter 10.

Therefore, the device of the invention can be used for the following applications. Firstly, there can be an application in which the storage section is used for storing small articles, such as keys or cards. In this embodiment, when an occupant opens and closes the shutter 10, the articles can be easily placed in or taken out the storage section 2 from the transverse or horizontal direction. In this case, miscellaneous or small articles can be stored in the cylindrical sections 22 forming the holding section 7, and the relatively large article can be placed on the flat walls 21. Also, when the shutter 10 is positioned at an arbitrary position or at the fully opened position, a portable phone or a cellular phone can be placed in the cylindrical section 22, so that it can be easily and conveniently taken out any time.

Figure 13A:
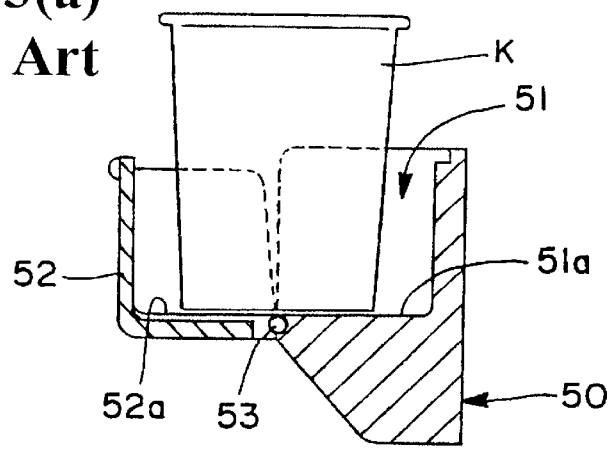
FIGS. 13(a) to 13(c) are explanatory views showing three examples of the conventional article storage devices.
Figure 13B:
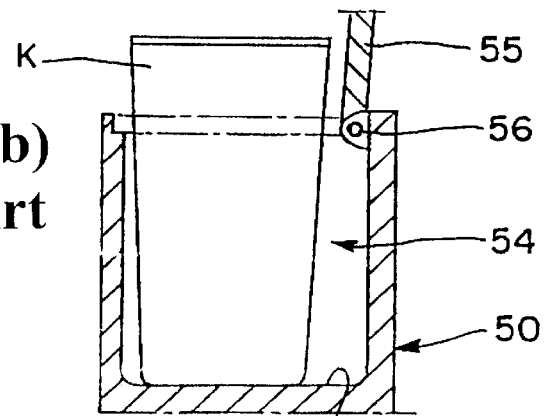
Figure 13C:
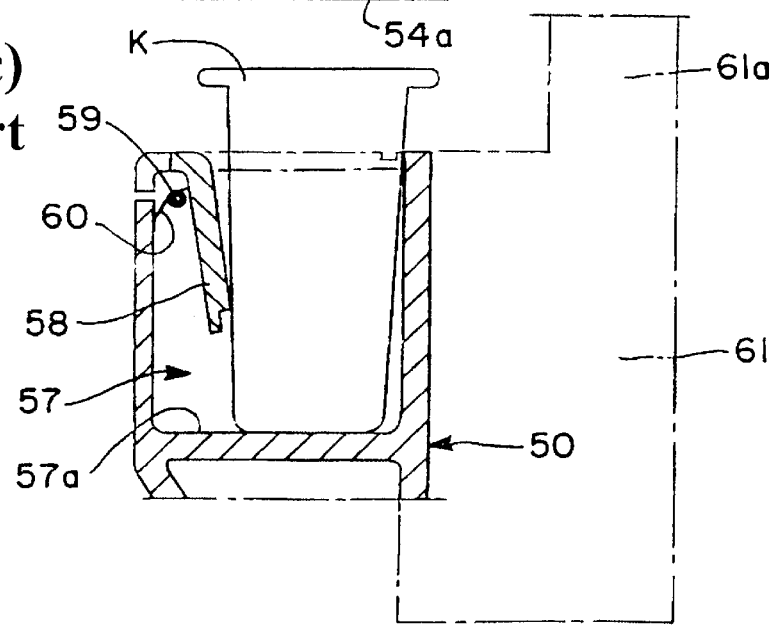

Secondly, there can be an application in which various kinds of drink containers are placed in the cylindrical sections 22 to hold the same. In this embodiment, as shown in FIG. 7(a), a paper cup K1, a relatively small-sized can K2, or the like is placed on the first bottom receiving section 25. Alternatively, as shown in FIG. 7(b), a relatively large-sized can K3, a bottle K4 or the like is placed on the second bottom receiving section 26. In this case, the paper cup K1 or the can K2 is held substantially vertically on the first bottom receiving section 25, and the can K3 or bottle K4 is held on the second bottom receiving section 26 in a state that the can K3 or the bottle K4 is inclined toward the front side of the opening, that is, in the state that the can K3 or bottle K4 can be easily taken out from the storage section by the occupant. Also, if the shutter 10 is moved to slide slightly upwardly as shown in FIG. 7(b), not only a periphery of a lower side of the relatively tall can K3 or bottle K4 is supported by an inner periphery of the cylindrical section 22, but also a periphery of an upper side of the can K3 or bottom K4 can be supported by a rim portion of the distal end of the shutter 10, so that the can K3 or bottle K4 can be held in a more stable manner. Regarding the ability of placing in or taken out the drink container, as compared with the conventional device opened at the upper side shown in FIGS. 13(a) to 13(c), the drink container can be more easily taken out and placed in the storage device of the invention, thereby improving the usability.

Thirdly, there can be an embodiment in which the optional member such as an ashtray described above is additionally attached to the attachment grooves 24 or the notch and the attachment grooves 24, to provide an added value. The optional member is not limited to the ashtray, and can be an exclusive article holder, such as a cellular phone holder, or a bottom supporting member as disclosed in Japanese Patent Publication No. 2001-237574.

FIGS. 8(a) and 8(b) show a modified example of the article storage device 1 described above. In an article storage device 1A, a shape of a lower side of a side plate 5A and a shape of a lower side of a guide groove 6A corresponding thereto are modified, and the other constituents are the same as in the article storage device 1. Therefore, the same constituents and sections as those in the storage device 1 are designated by the same numeral references to thereby omit the explanations thereof, and only the modified constituents will be explained. Namely, in this structure, the lower side of the side plate 5A is formed to have a width smaller than that of the side plate 5. Accordingly, the lower side of the guide groove 6A is curved at a curvature much closer to the circular arc. In this modified example, the lower side of the storage device 1A is made slimmer in view of the installation site, such as the interior wall of the vehicle and the door lining, at which the storage device 1A is installed. Other than this modified example, in accordance with the installation site, the entire size, and the cost thereof, the embodiment of the invention can be adequately modified. For example, the storage section 2 may be integrally formed in a molded resin, the storage section 2 may be formed by the back surface member, and the side surface members, or the shape of the back surface member can be changed.

Also, the shutter of the invention is not limited to the embodiments of the invention, and can be variously modified within the gist of the invention. Also, the shutter of the invention can be also used for the storage devices shown in FIGS. 14(a) to 14(c), or devices similar thereto.

As described above, in the article storage device of the invention disposed vertically, both the various types of the articles and the drink containers can be placed in or taken out from the storage section of the device from the lateral or horizontal direction. Thus, the handling ability of placing in or taking out the article is excellent. Also, since the storage section is greatly exposed, even small keys or the like can be stored in the storage device. Also, since the shutter slides along the guide grooves, the storage device is excellent in safety. Accordingly, as compared with the conventional device, the article storage device of the invention can improve the safety, the appearance characteristics, the application range, and the usability.

Further, according to the shutter used in the storage device of the invention, the projections are located at the lower side with a step or height difference between the projections and the shutter main body, such that the bending curve of the shutter main body at the time of being bent at the guide groove is deviated from the width of the guide groove toward the outer peripheral side due to the step. The distance between the projection and the main body and the distance between the projection and the thin walled portion adjacent thereto can be obtained. Therefore, even if the curvature of the guide groove is increased, the sliding characteristic of the shutter can be maintained. Further, while the rigidity of the shutter main body and the rigidity of the projection are maintained, the thin walled sections are formed at the soft resin portion between the pieces of the hard resin portions. Thus, the bending characteristic of the shutter main body is improved, and the appearance thereof can be improved by reducing the size of the recessed sections (notches or grooves) corresponding to the thin walled sections. As a result, the shutter of the invention can be used for many more purposes.

While the invention has been explained with reference to the specific embodiments of the invention, the explanation is illustrative and the invention is limited only by the appended claims.

What is claimed is:

1. An article storage device for storing an article, comprising:
    a storage section having an upper side, a front side and an opening extending from the front side to the upper side, and formed of side surfaces provided with protruded rim portions, a back surface and an inner bottom surface to thereby define an inside of the storage section, said storage section having guide grooves formed along the protruded rim portions, and
    a shutter slidably assembled in the guide grooves for opening and closing the opening of the storage section, said shutter being bendable in a sliding direction and having means for holding the shutter at an arbitrary position in the guide grooves.

2. An article storage device according to claim 1, wherein said shutter is formed of a molded resin.

3. An article storage device according to claim 1, wherein said bottom surface forms a holding section having a cylindrical shape with a bottom for holding a container as the article.

4. An article storage device according to claim 3, wherein said holding section includes a first bottom receiving section substantially horizontally formed at an inner lower surface side of the holding section, and a second bottom receiving section having a diameter larger than that of the first bottom receiving section and being inclined from a back surface side toward a front side.

5. An article storage device according to claim 1, wherein said shutter slides between a closed position, in which a distal end of the shutter abuts against the back surface of the storage section, and a maximum opened position, in which a stopper formed at an inner surface of the shutter abuts against the inner bottom surface of the storage section.

6. An article storage device according to claim 1, wherein the shutter includes a shutter main body having a plurality of thin walled portions and being bendable at a plurality of the thin walled portions, and a plurality of projections provided at both sides of the main body and being fitted in the guide grooves.

7. An article storage device according to claim 6, further comprising elastic portions formed at the projections as said means for holding the shutter, each elastic portion being formed of a thin wall portion or hollow portion, said projections and the elastic portions being fitted in the guide grooves so that the shutter can be held at the arbitrary position through the elastic portions.

8. An article storage device according to claim 6, wherein said main body and the projections are formed of a plurality of hard resin portions extending in a width direction with a predetermined interval in a sliding direction, and soft resin portions connecting the hard resin portions while covering surfaces of the hard resin portions, said soft resin portions forming the thin walled portions between the hard resin portions.

9. An article storage device according to claim 6, wherein each of said projections is disposed lower than the shutter main body with a step therebetween at a side surface of the main body, said step being set such that the main body is bent at a curved section of the guide groove along a bending curve deviated upward from a width of the guide groove.

10. An article storage device according to claim 9, wherein said each projection has a substantially L-shape and abutting portions with a substantially arc shape as means for holding the shutter, said abutting portions being formed at upper and lower surfaces of a horizontal portion of the L-shape of each projection, said abutting portions being in contact with opposed inner surfaces of the guide groove with a U-shape.

11. An article storage device according to claim 10, wherein the upper surface of the horizontal portion of the projection in one of the abutting portions has a hollow portion or thin wall portion such that the shutter can be held at the arbitrary position in the guide groove.

12. An article storage device according to claim 11, wherein said projection includes a small convex portion projecting at a distal end surface thereof, said small convex portion being capable of making point-contact with an inner surface of an intermediate portion of the U-shape of the guide groove in a state that the projection is fitted in the guide groove.

* * * * *